(12) United States Patent
Kouno

(10) Patent No.: US 6,963,450 B2
(45) Date of Patent: Nov. 8, 2005

(54) FRESNEL LENS AND DIE FOR THE SAME

(75) Inventor: Yoshihiro Kouno, Tokyo-to (JP)

(73) Assignee: Dai Nippon Printing Co., Ltd., Tokyo-to (JP)

(*) Notice: Subject to any disclaimer, the term of this patent is extended or adjusted under 35 U.S.C. 154(b) by 59 days.

(21) Appl. No.: 10/433,448

(22) PCT Filed: Nov. 27, 2001

(86) PCT No.: PCT/JP01/10318

§ 371 (c)(1),
(2), (4) Date: Jun. 25, 2003

(87) PCT Pub. No.: WO02/46806

PCT Pub. Date: Jun. 13, 2002

(65) Prior Publication Data

US 2004/0240061 A1 Dec. 2, 2004

(30) Foreign Application Priority Data

Dec. 6, 2000 (JP) .............................. 2000-371604

(51) Int. Cl.⁷ ......................... G02B 5/18; G02B 27/44
(52) U.S. Cl. ...................... 359/566; 359/569; 359/573; 359/574; 362/338
(58) Field of Search ................................ 359/566, 569, 359/573, 574, 575, 742; 362/338

(56) References Cited

U.S. PATENT DOCUMENTS

| | | | | |
|---|---|---|---|---|
| 1,500,185 A | * | 7/1924 | Gage | 362/309 |
| 5,121,980 A | * | 6/1992 | Cohen | 351/161 |
| 5,551,042 A | | 8/1996 | Lea et al. | 359/742 |
| 5,581,405 A | * | 12/1996 | Meyers et al. | 359/571 |
| 5,806,955 A | | 9/1998 | Parkyn, Jr. et al. | 362/31 |
| 5,969,862 A | | 10/1999 | Maruyama | 359/565 |
| 6,252,724 B1 | | 6/2001 | Scheer | 359/723 |

FOREIGN PATENT DOCUMENTS

WO    WO 9950596    10/1999

* cited by examiner

*Primary Examiner*—Timothy Thompson
(74) *Attorney, Agent, or Firm*—Ladas & Parry LLP

(57) ABSTRACT

Provided is a Fresnel lens the manufacture of that is unlikely to be affected by the working errors of the die in the optical axis and its neighborhood. Two lens surfaces 11, 11 that are disposed in the vicinity of the optical axis are disposed in the way they are shifted from each other in a direction along the optical axis, whereby the height Ha in this direction of the optical axis of a non-lens surface 12 located at the boundary between the two lens surfaces 11, 11 is made greater than an original height Ha of the non-lens surface 12 in a case where it is assumed that the lower ends 11a, 11a of each of these lens surfaces 11, 11 has been placed on the same flat plane intersecting the optical axis OA at a right angle with respect thereto. Also, the lens angle θa of at least one piece of lens surface 21 that is disposed in the vicinity of the optical axis is set to be greater than the original lens angle that should be given according to the focus calculation with respect to the lens angle 21.

15 Claims, 6 Drawing Sheets

US 6,963,450 B2

FRESNEL LENS AND DIE FOR THE SAME

TECHNICAL FIELD

The present invention relates to a Fresnel and a die for manufacturing the same.

BACKGROUND ART

A Fresnel lens is the one wherein a lens surface having a fine width has been repeatedly formed in the radial direction, with the optical axis of the entire lens being set as the center. Such Fresnel lens is manufactured utilizing a die. The die includes a mother die that has a number of Fresnel molding grooves that have been formed by cutting and that are intended to mold each lens surface and non-lens surfaces located between respective lens surfaces, a master die that is molded from the mother die, and a stamper that is molded from the master die. The master die is formed in such a way as to cause the Fresnel molding surface of the mother die surface having formed therein a number of Fresnel molding grooves to be transferred onto that master die. The stamper is formed in such a way as to cause the Fresnel molding surface thus transferred onto the master die to be transferred onto that stamper again. Accordingly, the Fresnel molding surface of the stamper surface has a configuration that is complementary with respect to the Fresnel surface having formed thereon the lens surface of the Fresnel lens. The Fresnel lens is formed by pouring a molten state of UV-curable resin onto the Fresnel lens molding surface of the stamper to a prescribed thickness, radiating ultraviolet rays thereon to thereby cure the resin, and peeling off the thus-cured resin from the stamper.

The lens angle of the Fresnel lens more decreases toward the optical axis of the lens and, on the other hand, the pitch of the lens surfaces (the interval between the lens surfaces when viewed in the radial direction of the lens) is constant. Accordingly, the level difference between the lens surfaces (the height of the non-lens surface) more decreases toward a zone nearer to the optical axis. On the other hand, in the process for manufacturing the mother die, the Fresnel molding grooves each of that corresponds to the corresponding lens surface and its corresponding non-lens surface of the Fresnel lens goes on to be cut by a cutting tool on a one-by-one basis. Therefore the working errors that are attributable to the positioning errors of that cutting tool or to the thermal deformation thereof inevitably occur. At this time, the magnitude of each of those working errors is approximately fixed regardless of the position in the radial direction of the lens. Accordingly, the effect of the working errors that is produced when cutting the mother die relatively increases toward the zone nearer to the optical axis. Therefore, there is the possibility that in the vicinity of the optical axis serious effects, which are non-ignorable, may sometimes be produced. For example, as illustrated in FIG. 9A, in a case where, at the time of working a mother die 1, one piece of Fresnel molding groove 2 that is to be formed in the vicinity of a center line CL of the die has failed to be cut-worked due to the working errors and has thus remained to exist as a non-worked portion Y, in a Fresnel lens 3 that is finally obtained according to that mother die 1, as shown in FIG. 9B, there occurs an omitted or deficient portion Y' corresponding to that non-worked portion Y. Resultantly, there occurs a defect that is called the so-called "pitch skip" wherein the portions that should have originally been made distinct from each other into two lens surfaces 4, 4 look like one continuous piece of lens surface 4.

DISCLOSURE OF THE INVENTION

In view of the above, an object of the present invention is to provide a Fresnel lens having a shape where influence of working errors hardly occurs in the vicinity of an optical axis thereof and a die for that Fresnel lens.

The present invention solves the above-described problems with the Fresnel lens and die that will be mentioned below.

A first Fresnel lens according to the present invention is the one wherein two lens surfaces are disposed in such a manner that the two lens surfaces are shifted from each other in a direction along an optical axis of the lens, whereby the height in this direction along the optical axis of a non-lens surface located at a boundary between the two lens surfaces is made greater than an original height of the non-lens surface in a case where it is assumed that one end of each of these lens surfaces has been placed on a same flat plane intersecting the optical axis at a right angle with respect thereto.

According to this Fresnel lens, the height of the non-lens surface located at the boundary between those two lens surfaces more increases than the original height thereof. Therefore, when working the die, the amount of cut-in of the cutting tool at the time of working the Fresnel molding groove corresponding to the non-lens surface increases, with the result that the effects of the working errors relatively decrease. Accordingly, by imparting such optical-axial shift to each of the lens surfaces disposed near the optical axis, the percentage of occurrence of the defects such as the pitch skips decreases, with the result that the yield at the time of working the die is improved.

In the first Fresnel lens, it may be arranged that a plurality of lens surfaces that are included in a specified range, a center of that accords with the optical axis, with one piece of the lens surface, or a plurality of the lens surfaces, being set to be one unit, are disposed in such a manner that the lens surfaces are disposed by being shifted in the direction along the optical axis for each unit. In the designing of the Fresnel lens, under the premise that one end (generally the outer-peripheral end) of each of the respective lens surfaces be placed on the same flat surface as that intersecting the optical axis at a right angle with respect thereto, the optical calculation such as the calculation of the focus position is performed, whereby there is determined the specification, the items of that include the lens angles of the respective lens surfaces. Accordingly, in a case where the lens surface has been shifted in the optical-axial direction as stated above, the effect of that is produced, such as that wherein the focus is shifted. However, since in the vicinity of the optical axis a sufficient amount of light is obtained, even when the focus of each lens surface has somewhat been shifted, the effect of that is small and is to such an extent as would be unknown to the viewer. On the other hand, since as stated above the effect of the working errors is great in the vicinity of the optical axis, the merit that is obtained by shifting of the lens surface is great. In this way, in case having shifted the lens surface in the specified range, the center of that accords with the optical axis, the merit that is much greater in extent than the convenience resulting from that is obtained. Therefore, making the construction as such is preferable.

The amount of shift of the lens surfaces between the units may be constant. In this case, when designing the lens, the process executed when determining the amount of shift of each lens surface is simplified. Resultantly, the programming for use with the working of the die also can be easily performed. On the other hand, the amount of shift of the lens surfaces between the units may be varied according to the distance in the radial direction as measured from the optical axis. If the construction is made like this, it is possible to impart to each lens surface a proper amount of shift that corresponds to the distance as measured from the optical axis. Further, the amount of shift of the lens surfaces between the units may be decreased as the distance in the radial direction as measured from the optical axis increases. Even in case imparting no shift to the lens surface, as the distance from the optical axis increases, the effect of the working errors decreases. Therefore, even when making smaller the amount of shift of the lens surface according to the present invention with an increase in the distance from the optical axis, the effect of the working errors does not appear. In addition, the more increased the distance from the optical axis is, the more decreased the amount of light is. Therefore, if making smaller the amount of shift of the lens surface in conformity with that fact, the shift of the lens surface becomes less remarkable.

In the second Fresnel lens according to the present invention, a lens angle of at least one piece of lens surface is set to be greater than an original lens angle which is to be given in accordance with focus calculation to be performed with respect to that lens surface.

In a case where having increased the lens angle in this way, the height of the apex of the lens surface increases with the result that the height of the non-lens surface that commonly has that apex also increases. For this reason, when working the die, the amount of cut-in of the cutting tool at the time when working the Fresnel molding groove corresponding to that non-lens surface increases, with the result that the effect of the working errors becomes relatively small. Accordingly, by increasing in this way the lens angle of the lens surface disposed near the optical axis, the percentage in which the defects such as pitch skip occur decreases, with the result that the yield when working the die is improved. It is to be noted that the lens angle is given as the angle by which the lens surface is inclined with respect to a flat surface intersecting the optical axis at a right angle with respect thereto. Also, the original lens angle which is to be given in accordance with the focus calculation is referred to as the angle that needs to be given to each lens surface in order to cause each of the focuses that are particularized correspondingly to the respective lens surfaces to coincide with the position that is pre-determined as the focus of the Fresnel lens as a whole.

In the second Fresnel lens, the lens angle of each of a plurality of lens surfaces that are included in a specified range, a center of that accords with the optical axis may be set to be greater than the original lens angle which is to be given with respect to each lens surface. In the Fresnel lens, in case having changed the lens angle from the original lens angle, the effect that the focus is shifted, etc. occurs. However, since in the vicinity of the optical axis a sufficient amount of light is obtained, even when the focuses of the respective lens surfaces are somewhat miss-converged, the effect of this miss-convergence is small and is to such an extent as would be unknown to the viewer. On the other hand, since as stated above the effect of the working errors is great in the vicinity of the optical axis, the merit that is obtained by shifting of the lens surface is great. In this way, in case having increased the lens angle in the specified range the center of that is the optical axis, the merit that is much greater in extent than the convenience resulting from that is obtained. Therefore, making the construction as such is preferable.

In a case where, as stated above, the lens angle of each of a plurality of lens surfaces is increased, a correction angle that is given as the difference between the lens angle and the original lens angle may be varied according to the distance in the radial direction as measured from the optical axis. If the construction is made like this, it is possible to impart to each lens surface a proper correction angle corresponding to the distance from the optical axis. In particular, in case having decreased the correction angle with an increase in the distance in the radial direction from the optical axis, it is possible to make relatively small the effect of miss-focusing, etc. as a result of having decreased the correction angle and having changed the lens angle in conformity with the decrease in the amount of light while preventing the effect of the working errors from being made tangible or appearing.

The third Fresnel lens is as follows. Namely, in a first specified range, a center of that accords with the optical axis, a plurality of lens surfaces, with one piece of the lens surface, or a plurality of the lens surfaces, being set to be one unit, are disposed in such a manner that the lens surfaces are disposed by being shifted from each other in the direction along the optical axis for each unit, whereby height in the direction along the optical axis of a non-lens surface located at each of boundaries between the respective units is made greater than an original height of the non-lens surface in a case where it is assumed that one end of each of these adjacent lens surfaces with the boundary being located therebetween has been placed on the same flat plane intersecting the optical axis at a right angle with respect thereto; and the lens angle of each of a plurality of the lens surfaces that are included in a second specified range, a center of that accords with the optical axis is set to be greater than the original lens angle which is to be given in accordance with focus calculation with respect to the each lens surface.

According to this Fresnel lens, for the same reason as was stated in connection with the above-described first and second Fresnel lenses, it is possible to prevent the effect of the working errors of the die from appearing in the vicinity of the optical axis and to decrease the percentage in which the defects such as pitch skips to thereby improve the yield at the time of working the die.

In the third Fresnel lens, the first specified range may be narrower than the second specified range. In this case, in a zone from the optical axis up to the boundary that defines the first specified range, the amount of cut-in of the cutting tool at the time when working, with respect to the die, the groove corresponding to each lens surface or non-lens surface is increased by increasing the shift in the optical-axial direction of the lens surface and the lens angle to thereby prevent the effect of the pitch skips, etc. as much as possible. In a zone from beyond the boundary up to the boundary that defines a second specified range, only the lens angle alone is increased to suppress the effect of the working errors while that prevention is being maintained as is. In case one piece of lens surface has been shifted in the optical-axial direction, the lens surface that is located inwards from that lens surface in the radial direction is also similarly shifted in the optical-axial direction. Therefore, in case having shifted each of a plurality of lens surfaces in the optical-axial direction, each of the lens surfaces that are formed in the vicinity of the optical axis is shifted, with respect to the lens surface outside the first specified range, in the optical-axial direction by a cumulative value of the amounts of shift of the respective lens surfaces. For that reason, as for the first specified range, when spreading it too much, the lens surface at the central part is more greatly retracted in the optical-axial direction than that on the outer side. Resultantly, when cutting the die, the configuration of that is complementary for that of that lens, it becomes necessary to more deeply cut the outer-peripheral side of the die in by the extent that corresponds to a cumulative amount of shift. Resultantly, the working efficiency decreases. On the other hand, if only changing the lens angle, such shift of the lens surface doesn't occur, with the result that it is impossible that the amount of cut-in of the die will cumulatively increase. On this account, in that third Fresnel lens, the first specified range that imparts a shift to the lens surface is limited to the vicinity of the optical axis where the effect of the working errors is relatively great while the second specified range is set to be wider than the first specified range to thereby reliably suppress the effect of the working errors.

The die of the present invention has a Fresnel lens molding surface, the configuration of that is the same as, or complementary for, that of the Fresnel lens surface provided with each of the lens surfaces of the Fresnel lens.

According to the die that has the above described construction, it is possible to suppress the effect of the working errors at the time of working the groove corresponding to the lens surface or non-lens surface and to thereby manufacture a high quality of Fresnel lens. Incidentally, the die of the present invention includes the die that as in the case of the above-described mother die which has formed thereon by the cutting work the Fresnel molding surface, the configuration of that is complementary for that of the Fresnel surface, as well as the die that as in the case of the above-described master or stamper die which has been obtained by copying the Fresnel molding surface of the die, which has been cutting-worked, through the use of a manufacturing method such as electroforming. The Fresnel molding surface of the cutting-worked die is not limited to the one, the configuration of that is complementary for that of the Fresnel surface of the Fresnel lens, and may have the same configuration as that of the Fresnel surface. In this case, the Fresnel lens needs only to be molded by copying the Fresnel molding surface to thereby separately mold a die having a Fresnel molding surface, the configuration of that is complementary for that of that Fresnel molding surface.

BEST MODE FOR CARRYING OUT THE INVENTION

Figure 1A:
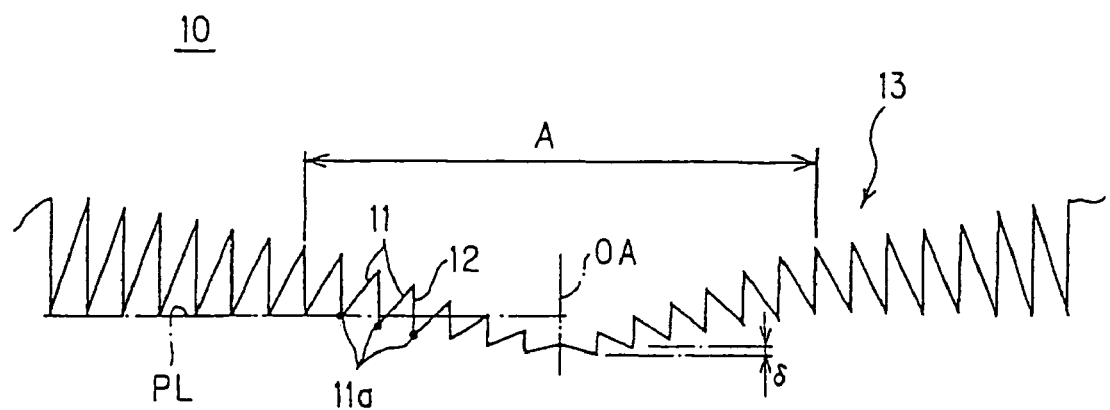
FIGS. 1A and 1B are sectional views each taken along the optical-axial direction of a Fresnel lens according to an embodiment of the present invention.
Figure 1B:
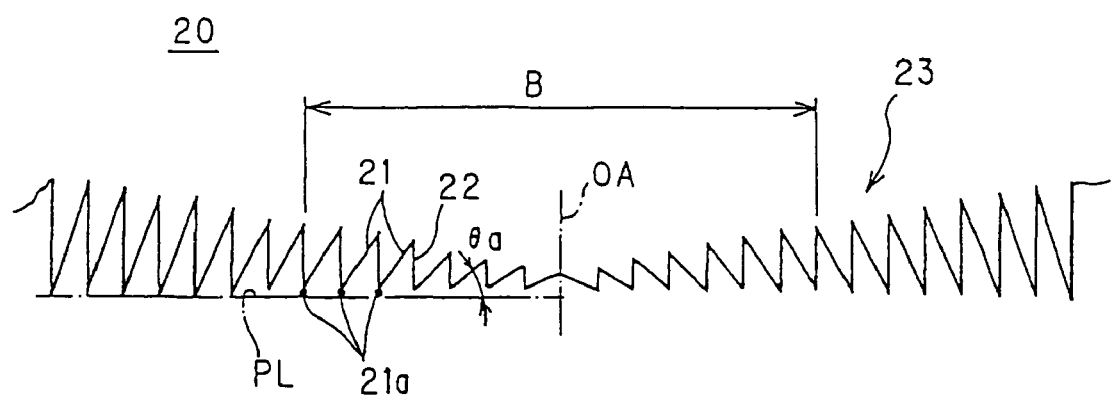

FIGS. 1A and 1B are views each illustrating an embodiment of a Fresnel lens of the present invention, FIG. 1A illustrating a Fresnel lens 10 wherein all lens surfaces 11 . . . 11 included in a specified range A the center of that is an optical axis OA have been shifted each by the amount δ of shift in the optical-axial direction, while FIG. 1B illustrates a Fresnel lens 20 wherein the lens angle θa of all lens surface 21 . . . 21 included in a specified range B the center of that is the optical axis OA have been more increased than their original lens angles. It is to be noted that FIGS. 1A and 1B each illustrates part of the neighborhood of the optical axis OA of a corresponding one of the Fresnel lenses 10 or 20. Each of the respective Fresnel lenses 10 and 20, as a whole, is sufficiently larger in size than the illustrated one. Hereinafter, the featuring portions of each of these Fresnel lenses 10 and 20 will be sequentially explained.

In the Fresnel lens 10 of FIG. 1A, in a zone outside the specified range A, the lower ends (the ends on the outer-peripheral side) 11a of the respective lens surfaces 11 are arranged in alignment with the same flat plane PL intersecting the optical axis OA at a right angle with respect thereto. Here, the state where one ends 11a of the respective lens surfaces 11 are placed on the same flat plane PL is defined as a state where the lens surfaces 11 is out of shift, in other words a state where the lens surfaces 11 are aligned with one another with respect to the optical-axial direction. In contrast to this, the lens surfaces 11 included in the specified range A are disposed by being shifted from one another in the optical-axial direction. Concretely, in the specified range A, in case having referred to any given two adjacent lens surfaces 11 that are adjacent to each other in the radial direction, those lens surfaces 11 are disposed so as to be shifted from each other in the optical-axial direction in such a manner that the lower end 11a of the lens surface 11 on the inner-peripheral side is shifted downwards with respect to the lower end 11a of the lens surface 11 on the outer-peripheral side.

Figure 2:
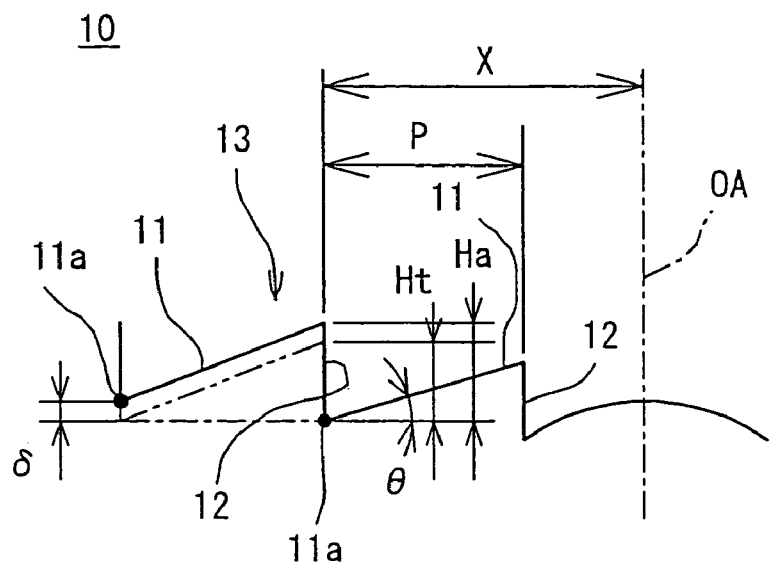
FIG. 2 is a view illustrating on an enlarged scale the lens surfaces of part, provided in the vicinity of the optical axis, of the Fresnel lens illustrated in FIG. 1A.

FIG. 2 illustrates the two lens surfaces 11, 11 that are included in the specified range A. Of the two lens surfaces 11, 11, the lens surface 11 on the outer side in the case where it has been assumed that the both lens surfaces 11 have been horizontally aligned with respect to the optical-axial direction with the lens surface 11 on the inner side being set as the basis is indicated in a two-dot chain line, while the lens surface 11 on the outer side in the case where the both lens surfaces 11, 11 have been shifted by the amount δ of shift in the optical-axial direction is indicated in a solid line. As for the height of the non-lens surface 12 located between the both lens surfaces 11, the height Ha in the case of having imparted the amount δ of shift to between the lens surfaces 11, 11 is greater than the original height Ht in the case where the lens surface 11 are aligned with each other. If making greater the height of the non-lens surface 12 in this way, in case forming in the die the grooves corresponding to the lens surfaces 11 or non-lens surfaces, the depth of that groove increases by the extent to which the height of the non-lens surface 12 has increased. As a result of this, the effect of the working errors made when cutting that groove becomes relatively small. Accordingly, there becomes small the possibility that the defects such as the so-called "pitch skips" will occur. Incidentally, the pitch P, regarding the radial direction, of each lens surface 11 illustrated in FIG. 2 is fixed from the optical axis OA up to the outermost periphery of the Fresnel lens 10. Also, the lens angle θ of the lens surface 11 gradually decreases toward the optical axis OA.

The above-described shift amount δ, irrespective of the distance X from the optical axis OA to each lens surface 11 (that here for convenience has been illustrated using the lower end 11a of the lens surface 11 as the basis), may be fixed in the specified range A, or may be varied according to the distance X. Also, while in the example of FIG. 1A all the lens surfaces 11 included in the specified range A are shifted each by a prescribed amount δ of shift in the optical-axial direction, it maybe arranged that a plurality of lens surfaces 11 be grouped as one unit and these lens surfaces be given the amount δ of shift in groups of that unit.

FIGS. 3A to 3D each illustrates several setting examples each regarding the relationship between the distance X from the optical axis and the amount δ of shift. It is to be noted that the amount δ of shift referred to in here is the one between two adjacent lens surfaces 11, 11. Also, in FIGS. 3C and 3D, the positions of the outer-peripheral ends of the lens surfaces are indicated in broken lines.

Figure 3A:
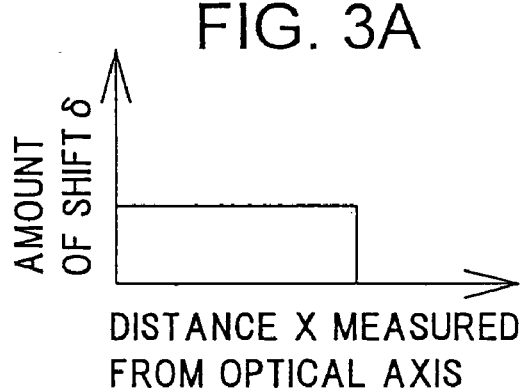
FIGS. 3A to 3D are views each illustrating the relationship between the distance as measured from the optical axis of the Fresnel lens of FIG. 2 and the amount of shift in the optical-axial direction of the lens surface.
Figure 3B:
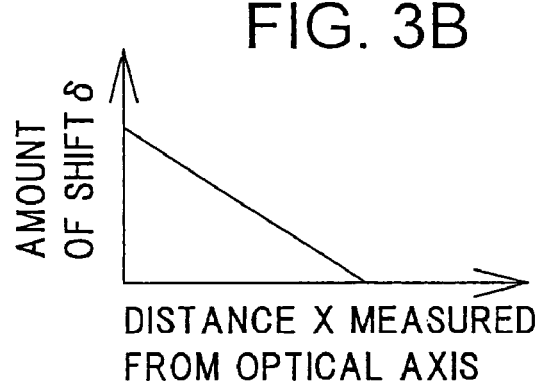
Figure 3C:
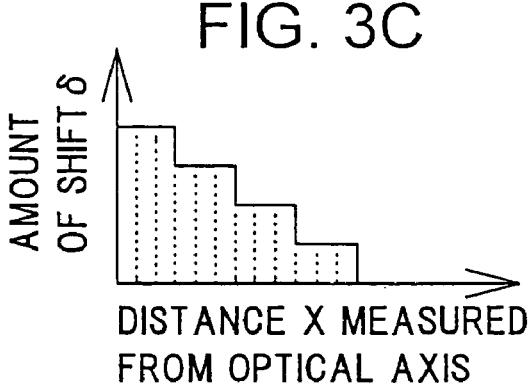
Figure 3D:
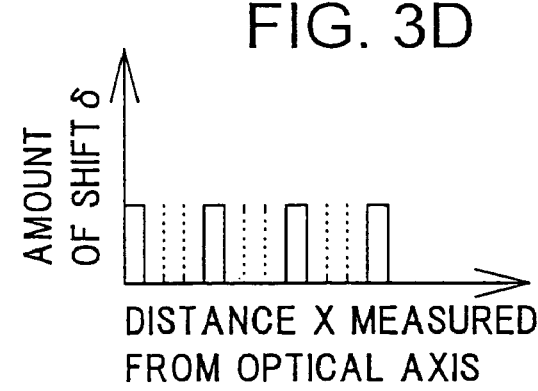

FIG. 3A illustrates an example wherein in the specified range A the amount δ of shift is made fixed irrespective of the distance X. FIGS. 3B and 3C illustrate examples where in the amount δ of shift is made smaller as the distance X increases. However, whereas in FIG. 3B the amount δ of shift is linearly decreased in proportion to the distance X, in FIG. 3C the amount δ of shift is stepwise decreased in units of a plurality of lens surfaces (in FIG. 3C in units of three lens surfaces). In FIG. 3C a plurality of lens surfaces are handled as one group and the amount of shift is varied in units of a group. Therefore, compared to a case where the amount of shift is varied in units of a lens surface, a cumulative value of the amounts δ of shift that cover from the optical axis OA to the outer-periphery of the specified range A becomes smaller. Thus, the total level difference between the lens surfaces 11 in the zone from the optical axis OA up to the outer periphery of the specified range A can be compressed. Further, FIG. 3D illustrates the amount δ of shift that has been given in units of a plurality of lens surfaces (in the figure in units of three lens surfaces). That is, FIG. 3D illustrates an example wherein a plurality of lens surfaces 11 are shifted. Within one unit, the respective lens surfaces 11 are in alignment with one another in the optical-axial direction.

Next, the Fresnel lens 20 of FIG. 1B will be explained with reference to FIGS. 4 and 5A to 5D. As apparent from FIG. 1B, in the Fresnel lens 20, the respective lens surfaces 21 are aligned with one another with respect to the optical axis. Namely, the lower ends (the ends on the outer-peripheral side) of the respective lens surfaces 21 are all placed on the same flat plane PL. Also, the pitch P in the radial direction of the lens surface 21 illustrated in FIG. 4 is fixed from the optical axis OA up to the outer-periphery of the Fresnel lens 20.

Figure 4:
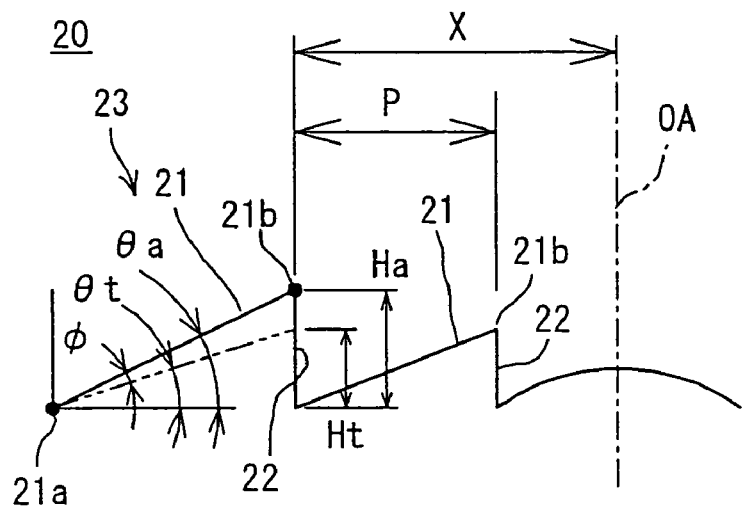
FIG. 4 is a view illustrating on an enlarged scale the lens surfaces of part, provided in the vicinity of the optical axis, of the Fresnel lens illustrated in FIG. 1B.

FIG. 4 illustrates a part of the lens surfaces 21 included in the specified range B of the Fresnel lens 20 of FIG. 1B. In this case, the lens surface 21 at the time when having given to it an original angle θt that should be given according to the focus calculation is indicated in a two-dot chain line while the lens surface 21 at the time when having given to it a correction angle Φ is indicated in a solid line. As apparent from FIG. 4, in case having given the original angle θt the correction angle Φ and having thereby increased an actual lens angle θa more than the original lens angle θt, the height Ha of the non-lens surface 22 that commonly has an upper end 21b jointly with that lens surface 21 is greater than the height Ht at the time when having given the original lens surface θt. If the non-lens surface 22 is greater in that way, as in the case of FIG. 1A, in case forming in the die the groove corresponding to the lens surface 21 or non-lens surface 22, the depth of that groove is increased by the extent to which the height of the non-lens surface 22 has increased. As a result of this, the effect of the working errors in the case of cutting that groove becomes relatively small. Therefore, the possibility that the defects such as the so-called "pitch skips" will come out becomes small.

Figure 5A:
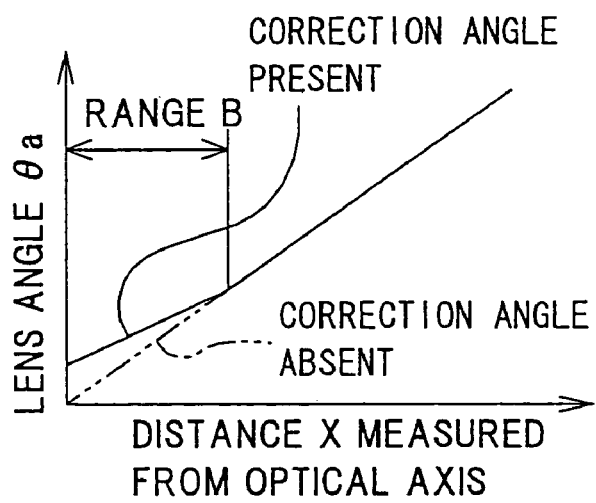
FIGS. 5A to 5D are views each illustrating the relationship between the distance as measured from the optical axis of the Fresnel lens of FIG. 4 and the angle of shift of the lens surface.
Figure 5B:
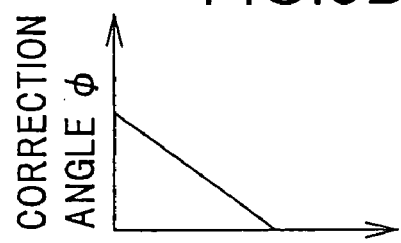

FIG. 5A illustrates the relationship between the distance X as measured from the optical axis OA of the Fresnel lens 20 of FIG. 1B and the lens angle θa of each lens surface 21. In a zone located outside the specified range B, the lens angle θa varies in proportion to the distance and the original lens angle θt in the case where in the specified range B no correction angle Φ is given has a value that is proportionate to the distance X in accordance with the lens angle θa outside the specified range B. Namely, that lens angle θt becomes zero on the optical axis OA (i.e. the distance=0). However, in this embodiment, in the specified range B, the correction angle Φ is given. In addition, as illustrated in FIG. 5B, the correction angle Φ linearly increases in response to the distance X so that that correction angle Φ may be come greater as the distance X is smaller. Accordingly, in the specified range B, the actual lens angle θa is greater than the original lens angle θt toward the optical axis. Provided, however, that the inclination of the actual lens angle θa is positive, with the result that when comparing the lens angles θa of the two adjacent lens surfaces 21, 21 with each other, the lens angle θa of the lens surface 21 on the outer side is necessarily greater than the lens angle θa of the lens surface 21 on the inner side.

Figure 5C:
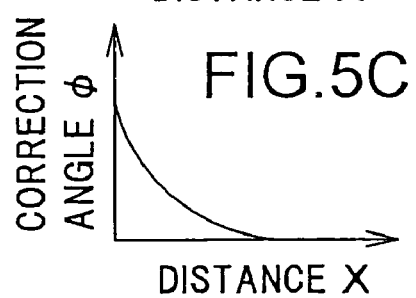
Figure 5D:
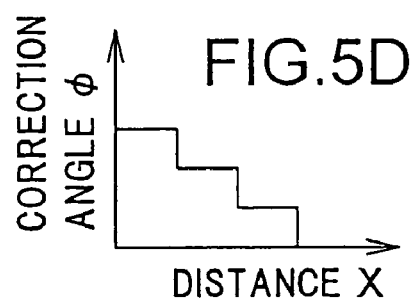

Incidentally, the relationship between the distance X and the correction angle Φ is not limited to the example of FIG. 5B. For example, as illustrated in FIG. 5C, the correction angle maybe the one that increases in inverse proportion to the distance X or as illustrated in FIG. 5D the one the correction angle Φ of that is stepwise increased as the distance X is decreased. Provided, however, that in the example of FIG. 5D a plurality of lens surfaces are included in one group of lens surfaces in which the correction angles Φ of respective lens surfaces are equal to each other. In anyway, in a case where the correction angle Φ has been made greater with the decrease of the distance X as in FIGS. 5B to 5D, it is preferable that in the vicinity of the optical axis where the height of the non-lens surface 22 decreases the effect of having given the correction angle Φ comes to appear remarkably. Therefore, this modification is preferable.

Figure 6A:
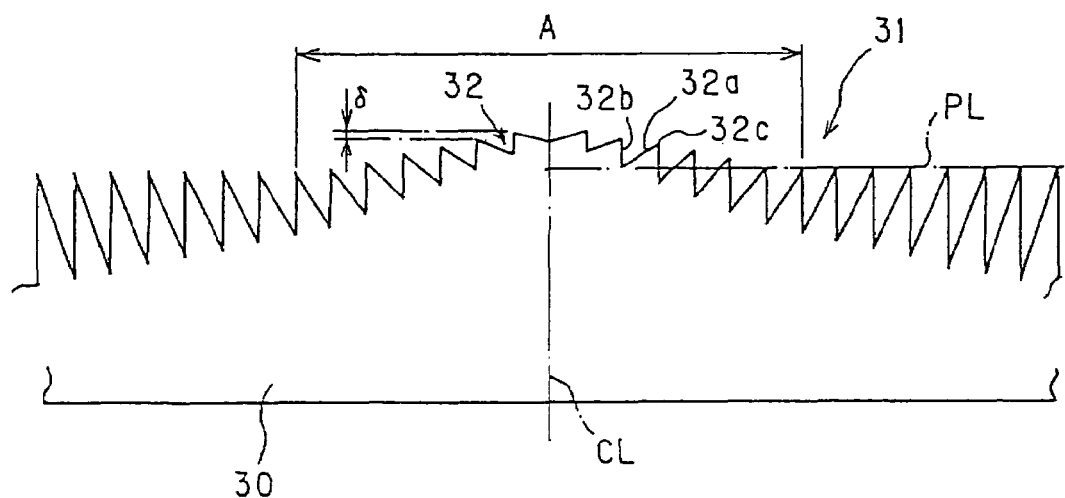
FIGS. 6A and 6B are views each illustrating a die for manufacturing the Fresnel lens of FIG. 1A or 1B.
Figure 6B:
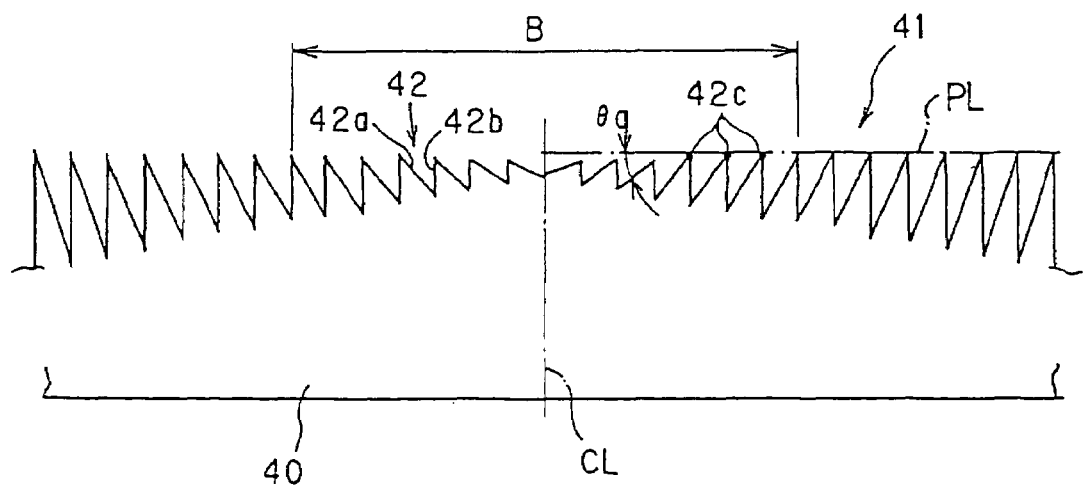

FIGS. 6A and 6B illustrate dies each for manufacturing the Fresnel lens of FIGS. 1A and 1B. The die 30 of FIG. 6A has a Fresnel lens molding surface 31 the configuration of that is complementary for that of the Fresnel surface 13 of the Fresnel lens 10 of FIG. 1A. In the Fresnel molding surface 31, a number of Fresnel molding grooves 32 . . . 32 are coaxially cut around the center line CL of the die. The Fresnel molding groove 32 has a first wall surface 32a for molding the lens surface 11 and a second wall surface 32b for molding the non-lens surface 12. The upper end 32c of the second wall surface 32b corresponding to the lower end 11a of the above-described lens surface 11. Accordingly, in the specified range A the center of that is the center line CL, the upper ends 32c are formed, as in the case of the lower ends 11a of the lens surfaces 11, in the way they are shifted with each other along the center line CL by the amount δ of shift. As a result of this, in the specified range A, the depth of each Fresnel molding groove 32 increases with the result that the effect of the working errors becomes relatively small, with the result that the coming-out percentage of the pitch defects, etc. decreases. In a zone outside the specified range A the upper ends 32c of the second wall surfaces 32b are aligned with one another.

On the other hand, the die 40 of FIG. 6B has a Fresnel molding surface 41 the configuration of that is complementary for that of the Fresnel surface 23 of the Fresnel lens 20 of FIG. 1B. The Fresnel molding surface 41 has coaxially cut in around the center line CL of the die a number of Fresnel molding grooves 42 . . . 42. The Fresnel molding groove 42 has a first wall surface 42a for forming the lens surface 21 and a second wall surface 42b for molding the non-lens surface 22. The upper end 42c of each second wall surface 42b corresponds to the lower end 21a of the above-described lens surface 21. Accordingly, the upper ends 42c of the respective second wall surfaces 42b are aligned on the same flat plate PL intersecting the center line CL at a right angle with respect thereto. The angle θa of inclination of the first wall surface 42a with respect to that flat plane PL is the same as the lens angle θa of the Fresnel lens 20 of FIG. 1B. And in the specified range B the center of that is the center line CL, the lens angle θa is set to be at a value obtained by adding the correction angle Φ to the original lens angle θt. As a result of this, in the specified range B, the depth of each Fresnel molding groove 42 is increased with the result that the effect of the working errors becomes relatively small with the result that the coming-out percentage of the pitch defects, etc. decreases.

Figure 7:
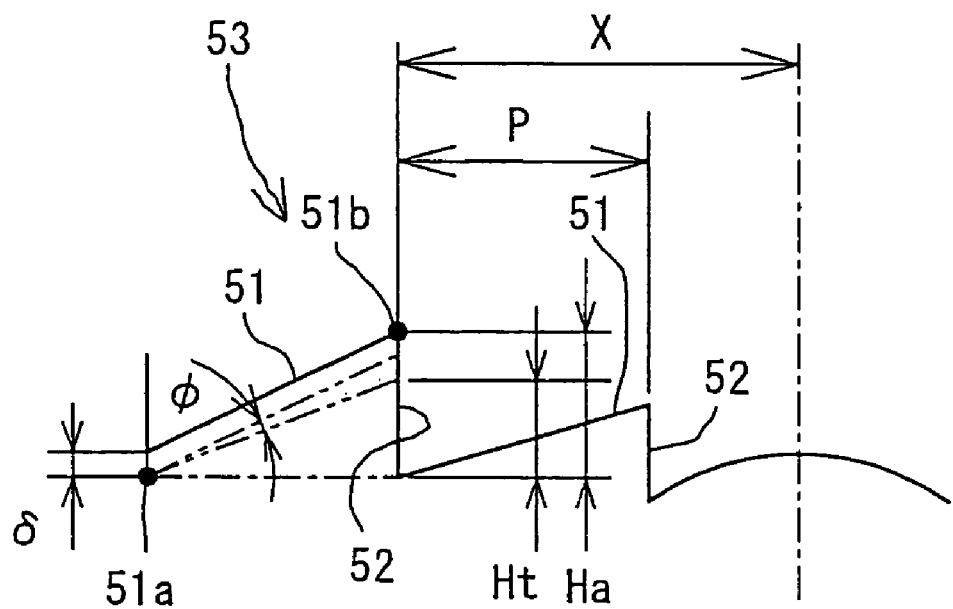
FIG. 7 is a view illustrating an embodiment wherein an amount of shift has been set between the lens surfaces and at the same time a correction angle has been given to the lens angle.
Figure 8:
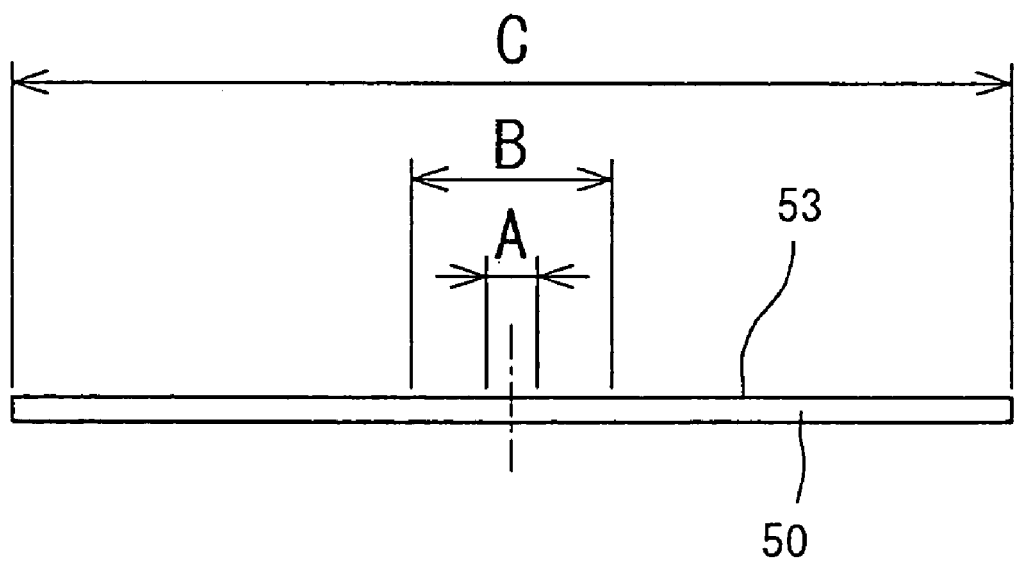
FIG. 8 is a view illustrating the relationship between a set range of the amount of shift of the Fresnel lens of FIG. 7 and a range wherein the correction angle is given.
Figure 9A:
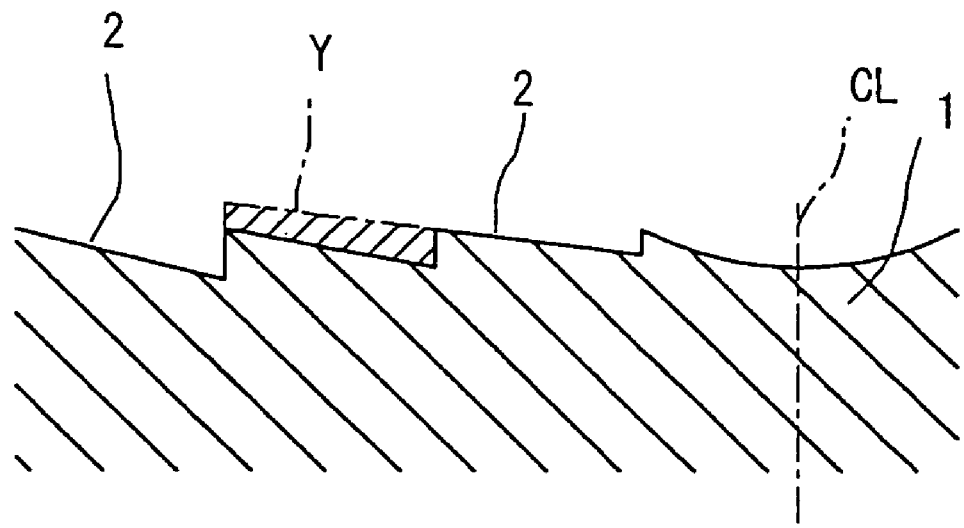
FIGS. 9A and 9B are views illustrating the problems of the present invention.
Figure 9B:
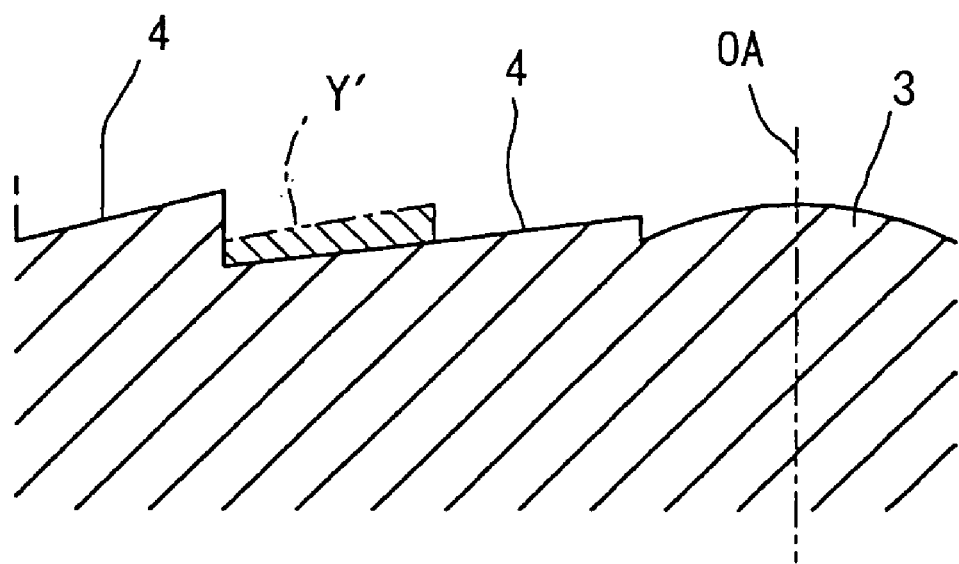

In the above-described embodiment, means for shifting the lens surface in the optical-axial direction and means for more increasing the lens angle than the original lens angle have been respectively separately applied, but these means can be applied together. Namely, as illustrated in FIG. 7, the actual height Ha of the non-lens surface 52 maybe increased by simultaneously imparting the optical-axial amount δ of shift similar to that in the example of FIG. 2 and the correction angle Φ similar to that in the example of FIG. 4. Incidentally, in the example of FIG. 7, as illustrated in FIG. 8, regarding the first specified range A within which the amount δ of shift is given to the lens surface 51 and the second specified range B within which the lens angle θ is increased by giving the correction angle Φ, it is preferable that the range A be set to be narrower than the range B. In this case, in the duplex part of the both ranges A and B, the amount δ of shift and the correction angle Φ are simultaneously given, and in a zone that is outside the range A and inside the range B, only the correction angle alone is given. While the die for molding the Fresnel lens 50 of FIG. 7 has a Fresnel molding surface the configuration of that is complementary for, or the same as, that of the Fresnel surface 53, the concrete configuration of that may be the one that is set in the way the Fresnel molding surface 31 or 41 of either one of the dies 30 and 40 illustrated in, for example, FIGS. 6A and 6B is set to be the basis and thereby the other Fresnel molding surface 41 or 31 is superposed upon the Fresnel molding surface 31 or 41. The illustration connected therewith is omitted.

Incidentally, in the drawings with reference to that the above-described embodiment has been stated, although the amount of shift of the lens surface, the lens angle of it, the correction angle for it, etc. are being drawn on an enlarged scale, the scope of the present invention is not limited to their extent illustrated in the drawings.

INDUSTRIAL APPLICABILITY

As has been explained above, according to the Fresnel lens of the present invention, since the height of the non-lens surface located at the boundary between the lens surfaces more increases than the conventional Fresnel lens, when working the die, there is increased the amount of cut-in of the cutting tool at the time of working the Fresnel molding groove corresponding to the non-lens surface, with the result that the effect of the working errors becomes relatively small. Resultantly, the percentage in which the defects such as the pitch skips decreases, with the result that the yield at the time of working the die is improved.

Also, according to the die of the present invention, it is possible to suppress the effect of the working errors when working the groove corresponding to the lens surface or non-lens surface and to thereby manufacture a high quality of Fresnel lens.

What is claimed is:

1. A Fresnel lens wherein two lens surfaces are disposed in such a manner that the two lens surfaces are shifted from each other in a direction along an optical axis of the lens, whereby height in the direction along the optical axis of a non-lens surface located at a boundary between the two lens surfaces is made greater than an original height of the non-lens surface in a case where it is assumed that one end of each of these lens surfaces has been placed on a same flat plane intersecting the optical axis at a right angle with respect thereto, the original height to be given in accordance with focus calculation to be performed with respect to the lens surface.

2. The Fresnel lens according to claim 1, wherein a plurality of lens surfaces that are included in a specified range, a center of that accords with the optical axis, with one piece of the lens surface, or a plurality of the lens surfaces, being set to be one unit, are disposed in such a manner that the lens surfaces are disposed by being shifted in the direction along the optical axis for each unit.

3. The Fresnel lens according to claim 2, wherein the amount of shift of the lens surfaces between the units is constant.

4. The Fresnel lens according to claim 2, wherein the amount of shift of the lens surfaces between the units is varied according to the distance in a radial direction as measured from the optical axis.

5. The Fresnel lens according to claim 2, wherein the amount of shift of the lens surfaces between the units decreases as the distance in a radial direction as measured from the optical axis increases.

6. A Fresnel lens wherein a lens angle of at least one piece of lens surface is set to be greater than an original lens angle which is to be given in accordance with focus calculation to be performed with respect to that lens surface.

7. The Fresnel lens according to claim 6, wherein the lens angle of each of a plurality of lens surfaces that are included in a specified range, a center of that accords with an optical axis is set to be greater than the original lens angle which is to be given with respect to each lens angle.

8. The Fresnel lens according to claim 7, wherein a correction angle that is given as the difference between the lens angle and the original lens angle is varied according to the distance in a radial direction as measured from the optical axis.

9. The Fresnel lens according to claim 8, wherein the correction angle decreases as the distance in the radial direction as measured from the optical axis increases.

10. A Fresnel lens wherein a plurality of lens surfaces that are included in a first specified range, a center of that accords with an optical axis, with one piece of the lens surface, or a plurality of the lens surfaces, being set to be one unit, are disposed in such a manner that the lens surfaces are disposed by being shifted from each other in a direction along the optical axis for each unit, whereby height in the direction along the optical axis of a non-lens surface located at each of boundaries between the respective units is made greater than an original height of the non-lens surface in a case where it is assumed that one end of each of these adjacent lens surfaces with the boundary being located therebetween has been placed on the same flat plane intersecting the optical axis at a right angle with respect thereto; and the lens angle of each of a plurality of the lens surfaces that are included in a second specified range, a center of that accords with the optical axis is set to be greater than an original lens angle which is to be given in accordance with focus calculation to be performed with respect to each lens surface.

11. The Fresnel lens according to claim 10, wherein the first specified range is narrower than the second specified range.

12. A die for a Fresnel lens, wherein the die has a Fresnel molding surface, a configuration of that is the same as, or complementary for, that of the Fresnel surface provided with each of the lens surfaces of the Fresnel lens as described in any one of claims 1 to 11.

13. A Fresnel lens wherein two lens surfaces are disposed in such a manner that the two lens surfaces are shifted from each other in a direction along an optical axis of the lens, whereby height in the direction along the optical axis of a non-lens surface located at a boundary between the two lens surfaces is made greater than an original height of the non-lens surface in a case where it is assumed that one end of each of these lens surfaces has been placed on a same flat plane intersecting the optical axis at a right angle with respect thereto, wherein a plurality of lens surfaces that are included in a specified range, a center of that accords with the optical axis, with one piece of the lens surface, or a plurality of the lens surfaces, being set to be one unit, are disposed in such a manner that the lens surfaces are disposed by being shifted in the direction along the optical axis for each unit, and the amount of shift of the lens surfaces between the units is varied according to the distance in a radial direction as measured from the optical axis.

14. A Fresnel lens wherein two lens surfaces are disposed in such a manner that the two lens surfaces are shifted from each other in a direction along an optical axis of the lens, whereby height in the direction along the optical axis of a non-lens surface located at a boundary between the two lens surfaces is made greater than an original height of the non-lens surface in a case where it is assumed that one end of each of these lens surfaces has been placed on a same flat plane intersecting the optical axis at a right angle with respect thereto, wherein a plurality of lens surfaces that are included in a specified range, a center of that accords with the optical axis, with one piece of the lens surface, or a plurality of the lens surfaces, being set to be one unit, are disposed in such a manner that the lens surfaces are disposed by being shifted in the direction along the optical axis for each unit, and the amount of shift of the lens surfaces between the units decreases as the distance in a radial direction as measured from the optical axis increases.

15. A Fresnel lens wherein a lens angle of each of a plurality of lens surfaces that are included in a specified range, a center of that accords with an optical axis, is set to be greater than an original lens angle which is to be given in accordance with focus calculation to be performed with respect to that lens surface, a correction angle that is given as the difference between the lens angle and the original lens angle is varied according to the distance in a radial direction as measured from the optical axis, and the correction angle decreases as the distance in the radial direction as measured from the optical axis increases.

* * * * *